United States Patent
Weinkötz et al.

(10) Patent No.: US 8,187,709 B2
(45) Date of Patent: *May 29, 2012

(54) LIGHT WOOD-BASED MATERIALS HAVING GOOD MECHANICAL PROPERTIES AND LOW FORMALDEHYDE EMISSION

(75) Inventors: Stephan Weinkötz, Neustadt (DE); Michael Finkenauer, Westhofen (DE); Michael Schmidt, Speyer (DE); Maxim Peretolchin, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/679,181

(22) PCT Filed: Sep. 16, 2008

(86) PCT No.: PCT/EP2008/062275
§ 371 (c)(1),
(2), (4) Date: Mar. 19, 2010

(87) PCT Pub. No.: WO2009/037240
PCT Pub. Date: Mar. 26, 2009

(65) Prior Publication Data
US 2011/0039090 A1 Feb. 17, 2011

(30) Foreign Application Priority Data

Sep. 19, 2007 (EP) .................................. 07116701

(51) Int. Cl.
*B32B 5/66* (2006.01)
(52) U.S. Cl. ........ 428/403; 428/323; 428/326; 428/327; 428/537.1; 427/212
(58) Field of Classification Search ............. 428/323, 428/326, 327, 403, 537.1; 427/212
See application file for complete search history.

(56) References Cited

U.S. PATENT DOCUMENTS

| | | |
|---|---|---|
| 4,513,105 A | 4/1985 | Hahn et al. |
| 4,525,484 A | 6/1985 | Hahn et al. |
| 5,104,903 A | 4/1992 | Hahn et al. |
| 5,554,429 A * | 9/1996 | Iwata et al. ............... 428/105 |
| 6,524,652 B2 | 2/2003 | Frick et al. |
| 6,723,766 B1 | 4/2004 | Hirano et al. |
| 2005/0019548 A1 * | 1/2005 | Liu et al. ............... 428/313.5 |

FOREIGN PATENT DOCUMENTS

| | | | |
|---|---|---|---|
| CH | 370229 A | | 6/1963 |
| DE | 845264 C | | 8/1952 |
| DE | CH370229 A | * | 6/1963 |
| DE | 392148 A1 | | 1/1991 |
| DE | 10028607 A1 | | 4/2001 |
| EP | 0025245 A2 | | 3/1981 |
| EP | 0106129 B1 | | 8/1986 |
| GB | 2072686 A | | 10/1981 |
| JP | 6-31708 A | | 2/1994 |
| WO | WO-02/26851 A1 | | 4/2002 |
| WO | WO-02/38676 A1 | | 5/2002 |
| WO | WO-2004/113428 A1 | | 12/2004 |
| WO | WO-2007/081645 A2 | | 7/2007 |

OTHER PUBLICATIONS

U.S. Appl. No. 12/161,276, filed Jul. 17, 2008, Rüba et al.

* cited by examiner

*Primary Examiner* — Leszek Kiliman
(74) *Attorney, Agent, or Firm* — Connolly Bove Lodge & Hutz LLP

(57) ABSTRACT

A light wood-containing material having an average density in the range from 200 to 600 kg/m$^3$, comprising, based in each case on the wood-containing material:
A) from 30 to 95% by weight of wood particles;
B) from 1 to 15% by weight of a filler having a bulk density in the range from 10 to 100 kg/m$^3$, selected from the group consisting of foamable plastic particles and already foamed plastic particles;
C) from 3 to 50% by weight of a binder comprising an aminoplast resin and an organic isocyanate having at least two isocyanate groups and, if appropriate,
D) additives.

18 Claims, No Drawings

LIGHT WOOD-BASED MATERIALS HAVING GOOD MECHANICAL PROPERTIES AND LOW FORMALDEHYDE EMISSION

CROSS-REFERENCE TO RELATED APPLICATIONS

This application is a national stage application (under 35 U.S.C. §371) of PCT/EP2008/062275, filed Sep. 16, 2008, which claims benefit of European application 07116701.9, filed Sep. 19, 2007.

BACKGROUND OF THE INVENTION

The present invention relates to a light wood-containing material having an average density in the range from 200 to 600 kg/m$^3$, comprising, based in each case on the wood-containing material:
A) from 30 to 95% by weight of wood particles;
B) from 1 to 15% by weight of a filler having a bulk density in the range from 10 to 100 kg/m$^3$, selected from the group consisting of foamable plastic particles and already foamed plastic particles;
C) from 3 to 50% by weight of a binder comprising an aminoplast resin and an organic isocyanate having at least two isocyanate groups and, if appropriate,
D) additives.

The present invention furthermore relates to a multilayer wood-base material comprising the wood-containing material according to the invention, a process for the production of light wood-containing materials, a process for the production of a multilayer wood-base material, the use of the light wood-containing material according to the invention and of the multilayer wood-base material according to the invention, the use of a binder comprising an aminoplast resin and an organic isocyanate having at least two isocyanate groups, the molar formaldehyde: —NH$_2$ group ratio being in the range from 0.3 to 1.0, for the production of wood-containing materials or multilayer wood-base materials having a density in the range from 200 to 600 kg/m$^3$.

Wood-base materials, in particular multilayer wood-base materials, are an economical and resource-protecting alternative to solid wood and have become very important in particular in furniture construction, in laminate floors and as construction materials. Starting materials used are wood particles of different thickness, for example wood chips or wood fibers from various timbers. Such wood particles are usually pressed with natural and/or synthetic binders and, if appropriate, with addition of further additives to give sheet-like or strand-like wood-base materials.

In order to achieve good mechanical properties of the wood-base materials, the latter are produced with a density of about 650 kg/m$^3$ or more. Wood-base materials having this density or the corresponding parts, such as furniture, are often too heavy for users, in particular private consumers.

The industrial demand for light wood-base materials has therefore increased in recent years, in particular since takeaway furniture has grown in popularity. Furthermore, the increasing oil price which leads to a continuous increase in, for example, the transport costs is giving rise to greater interest in light wood-base materials.

In summary, light wood-base materials are of major importance for the following reasons:

Light wood-base materials lead to simpler handling of the products by the end customers, for example during packing, transporting, unpacking or assembly of the items of furniture.

Light wood-base materials lead to lower transport and packaging costs; furthermore, material costs can be cut in the production of light wood-base materials.

For example, when used in means of transport, light wood-base materials can lead to lower energy consumption of these means of transport. Furthermore, with the use of light wood-base materials, for example, material-consumptive decorative parts, such as thicker worktops and side panels which are currently in fashion in kitchens, can be made available more economically.

Against this background and against the background of an increasing regulation for further reduction of formaldehyde emissions from wood-base materials, there is a wish for providing light wood-base materials having lower formaldehyde emission but, as in the past, good performance characteristics and processing properties.

The prior art contains a variety of proposals for reducing the density of wood-base materials.

For example, tubular particle boards and honeycomb boards may be mentioned as light wood-base materials which are obtainable by constructional measures. Owing to their particular properties, tubular particle boards are used mainly as inner layer in the production of doors.

For example, the excessively low screw withdrawal resistance, the complicated fixing of fittings and the difficulties in edging are disadvantageous in the case of the honeycomb board.

Furthermore, the prior art contains proposals for reducing the density of the wood-base materials by additions to the glue or to the wood particles.

CH 370229 describes light moldings which are simultaneously pressure-resistant and consist of wood particles or wood fibers, a binder and a porous plastic serving as filler. For the production of the moldings, the wood particles or fibers are mixed with binder and foamable or partly foamable plastics and the mixture obtained is pressed at elevated temperature. Binders which may be used are all customary binders suitable for the gluing of wood, such as, for example, urea-formaldehyde resins. Suitable fillers are foamable or already foamed plastic particles, preferably expandable thermoplastics, such as styrene polymers. The boards described in the examples have a density of from 220 kg/m$^3$ to 430 kg/m$^3$ and an average flexural strength of from 3.6 N/mm$^2$ to 17.7 N/mm$^2$ at a thickness of from 18 to 21 mm. The transverse tensile strengths are not stated in the examples. Regarding formaldehyde emission or a combination of aminoplasts and isocyanates in the binder, CH 370229 makes no statement.

WO 02/38676 describes a process for the production of light products, in which from 5 to 40% by weight of foamable or already foamed polystyrene having a particle size of less than 1 mm, from 60 to 95% by weight of lignocellulose-containing material and binder are mixed and are pressed at elevated temperature and elevated pressure to give the finished product. The customary binders are mentioned, inter alia MDI. Regarding formaldehyde emission or a combination of aminoplasts and isocyanates in the binder, WO 02/38676 makes no statement.

US 2005/0019548 describes light OSB boards using fillers having a low density. Polymeric binders, for example diphenylmethane 4,4-diisocyanate resin, are described as binders. Glass, ceramic, perlite or polymeric materials are described as fillers. The polymeric material is used in an amount of from 0.8 to 20% by weight, based on the OSB board. In the examples, the material Dualite, which consists of polypropylene, polyvinylidene chloride or polyacrylonitrile, is used as polymeric material. A weight reduction of 5% is described. In the examples, OSB boards having a density of from 607 to 677 kg/m$^3$ and a transverse tensile strength of from 0.31 to 0.59 N/mm$^2$ are described. Regarding formaldehyde emission or a combination of aminoplasts and isocyanates in the binder, US 2005/0019548 makes no statement.

JP 06031708 describes light wood-base materials, a mixture of 100 parts by weight of wood particles and from 5 to 30 parts by weight of particles of synthetic resin foam being used for the middle layer of a three-layer particle board, these resin particles having a specific gravity of not more than 0.3 g/cm$^3$ and a compressive strength of at least 30 kg/cm$^2$. Furthermore, it is stated that the specific density of the wood particles should not exceed a value of 0.5 g/cm$^3$. According to JP 06031708, the binders are not subject to any restrictions and it is possible to use the customary ones, inter alia polyfunctional isocyanates. Regarding formaldehyde emission or a combination of aminoplasts and isocyanates in the binder, JP 06031708 makes no statement.

EP 0 025 245 B describes a process for the production of particle boards comprising a binder of polyisocyanate and aminoplast glue, the aminoplast glue being prepared with the use of from 0.25 to 0.625 mol of formaldehyde per mole equivalent of amino groups. EP 0 025 245 B does not disclose fillers or the density of the particle boards.

In summary, the disadvantage of the prior art is that the light (wood-base) materials described have a mechanical strength which is too low, such as, for example, a screw withdrawal resistance which is too low, for furniture production.

A mechanical strength which is too low can, for example, lead to breaking or tearing of the structural elements. Furthermore, these structural elements tend to exhibit additional chipping off of further wood material during drilling or sawing. In the case of these materials, the fixing of fittings is difficult.

Furthermore, the edging properties, i.e. the application and adhesion of edge materials, for example to particle boards, are still unsatisfactory in the prior art.

With regard to the formaldehyde emissions, too, there remains room for improvements in the case of the wood-base materials of the prior art.

BRIEF SUMMARY OF THE INVENTION

The object of the present invention was to provide light wood-containing materials and light wood-base materials having low formaldehyde emission, which have a lower density compared with the commercially available wood-base materials in combination with good mechanical strengths and good processing properties, in particular edging properties.

The mechanical strength can be determined, for example, by measuring the transverse tensile strength according to EN 319.

For evaluating the edging properties or the adhesive bonding of edges to particle boards, the TKH data sheet (Technische Komission Holzklebstoffe im Industrieverband Klebstoffe e.V.) of January 2006, Table 10, can be consulted. A test for the edging properties is described in the examples.

Furthermore, these light wood-base materials should preferably be capable of being produced using native, European timbers.

Furthermore, the swelling value of the light wood-base materials should not be adversely affected by the reduced density.

The object was achieved by a light wood-containing material having an average density in the range from 200 to 600 kg/m$^3$, comprising, based in each case on the wood-containing material:
A) from 30 to 95% by weight of wood particles;
B) from 1 to 15% by weight of a filler having a bulk density in the range from 10 to 100 kg/m$^3$, selected from the group consisting of foamable plastic particles and already foamed plastic particles;
C) from 3 to 50% by weight of a binder comprising an aminoplast resin and an organic isocyanate having at least two isocyanate groups and, if appropriate,
D) additives.

The sum of the components A) to D) is 100% by weight and is based on the solid of the wood-containing material.

DETAILED DESCRIPTION OF THE INVENTION

The wood-containing material may comprise the customary small amounts of water (in a customary small range of variation); this water is not taken into account in the stated weights of the present application.

The stated weight of the wood particles is based on wood particles dried in a customary manner known to the person skilled in the art.

The stated weight of the binder is based, with regard to the aminoplast component in the binder, on the solids content of the corresponding component (determined by evaporating the water at 120° C. in the course of 2 h according to, for example, Günter Zeppenfeld, Dirk Grunwald, Klebstoffe in der Holz- und Möbelindustrie, 2nd edition, DRW Verlag, page 268) and, with regard to the isocyanate, in particular the PMDI, on the isocyanate component as such, i.e. for example without solvent or emulsifying medium.

The light wood-containing materials according to the invention have an average density of from 200 to 600 kg/m$^3$, preferably from 200 to 575 kg/m$^3$, particularly preferably from 250 to 550 kg/m$^3$, in particular from 300 to 500 kg/m$^3$.

The transverse tensile strength of the light wood-containing materials according to the invention or preferably of the multilayer wood-base materials according to the invention is in the range from 0.1 N/mm$^2$ to 1.0 N/mm$^2$, preferably from 0.3 to 0.8 N/mm$^2$, particularly preferably from 0.4 to 0.6 N/mm$^2$.

The determination of the transverse tensile strength is effected according to EN 319.

Suitable multilayer wood-base materials are all materials which are produced from wood veneers, preferably having an average density of the wood veneers of from 0.4 to 0.85 g/cm$^3$, for example veneer boards or plywood boards or laminated veneer lumber (LVL).

Other suitable multilayer wood-base materials are all materials which are produced from wood particles, preferably having an average density of the wood particles of from 0.4 to 0.85 g/cm$^3$, for example particle boards or OSB boards, and wood fiber materials, such as LDF, MDF and HDF boards. Particle boards and fiber boards are preferred, in particular particle boards.

The average density of the wood particles of component A) is as a rule from 0.4 to 0.85 g/cm$^3$, preferably from 0.4 to 0.75 g/cm$^3$, in particular from 0.4 to 0.6 g/cm$^3$.

Any desired wood type is suitable for the production of the wood particles; for example, spruce, beech, pine, larch, lime, poplar, ash, chestnut or fir wood is suitable, and spruce and/or beech wood are preferred, in particular spruce wood.

The dimensions of the wood particles are not critical and depend as usual on the wood-base material to be produced, for example on the abovementioned wood-base materials, such as particle board or OSB.

Foamable, still compact or already foamed plastic particles, preferably thermoplastic particles, are suitable as filler B). However, it is also possible to use plastic particles which are in any desired intermediate stage of foaming. Unless expressly described otherwise, all these foamable or foamed or prefoamed plastic particles are referred to below as plastic particles according to the invention.

The term foamed plastic or especially foam is explained, for example, in DIN 7726: 1982-05.

Plastic-foam particles which can be obtained from moldings, for example from polyurethane foam moldings or polystyrene foam moldings, by comminution are also suitable as component for the fillers B).

Suitable polymers on which the plastic particles according to the invention are based are all polymers, preferably thermoplastic polymers, which can be foamed. These are known to the person skilled in the art.

Very suitable polymers of this type are, for example, PVC (rigid and flexible), polycarbonates, polyisocyanurates, polycarbodiimides, polyacrylimides and polymethacrylimides, polyamides, polyurethanes, aminoplast resins and phenol resins, styrene homopolymers, styrene copolymers, $C_2$-$C_{10}$-olefin homopolymers, $C_2$-$C_{10}$-olefin copolymers and polyesters. The 1-alkenes, for example ethylene, propylene, 1-butene, 1-hexene or 1-octene, are preferably used for the preparation of said olefin polymers.

The plastic particles according to the invention of component B) have a bulk density of from 10 to 100 kg/m$^3$, preferably from 15 to 80 kg/m$^3$, particularly preferably from 20 to 70 kg/m$^3$, in particular from 30 to 60 kg/m$^3$. The bulk density is usually determined by weighing a defined volume filled with the bulk material.

Prefoamed plastic particles according to the invention are used in general in the form of spheres or beads having an average diameter of, advantageously, from 0.25 to 10 mm, preferably from 0.5 to 5 mm, in particular from 0.75 to 3 mm.

Prefoamed plastic particle spheres according to the invention advantageously have a small surface area per unit volume, for example in the form of a spherical or elliptical particle.

The prefoamed plastic particle spheres according to the invention advantageously have closed cells. The proportion of open cells according to DIN-ISO 4590 is as a rule less than 30%.

If the filler B) consists of different polymer types, i.e. polymer types based on different monomers (for example polystyrene and polyethylene or polystyrene and homopolypropylene or polyethylene and homopolypropylene), they may be present in different weight ratios, which however are not critical according to the current prior art.

Furthermore, additives, nucleating agents, plasticizers, flameproofing agents, soluble and insoluble inorganic and/or organic dyes and pigments, e.g. IR absorbers, such as carbon black, graphite or aluminum powder, can be added to the thermoplastics according to the invention, together or spatially separately, as additives.

Polystyrene and/or styrene copolymer are preferably used as the sole plastic particle component according to the invention in filler B).

The filler polystyrene and/or styrene copolymer can be prepared by all polymerization processes known to the person skilled in the art [cf. for example Ullmann's Encyclopedia, Sixth Edition, 2000 Electronic Release]. For example, the preparation is effected in a manner known per se by suspension polymerization or by means of extrusion processes.

In the suspension polymerization, styrene, if appropriate with addition of further comonomers, is polymerized in aqueous suspension in the presence of a customary suspension stabilizer by means of catalysts forming free radicals. The blowing agent and, if appropriate, further additives, can be concomitantly initially taken in the polymerization or added to the batch in the course of the polymerization or after the end of the polymerization. The bead-like expandable styrene polymers obtained are separated off from the aqueous phase after the end of the polymerization, washed, dried and sieved.

In the extrusion process, the blowing agent is mixed into the polymer, for example via an extruder, transported through a die plate and granulated to give particles or strands.

Blowing agents used are all blowing agents known to the person skilled in the art, for example $C_3$- to $C_6$-hydrocarbons, such as propane, n-butane, isobutane, n-pentane, isopentane, neopentane and/or hexane, alcohols, ketones, ethers or halogenated hydrocarbons. A commercially available pentane isomer mixture is preferably used.

Furthermore, additives, nucleating agents, plasticizers, flameproofing agents, soluble and insoluble inorganic and/or organic dyes and pigments, e.g. IR absorbers, such as carbon black, graphite or aluminum powder, can be added to the styrene polymers, together or spatially separately, as additives.

If appropriate, styrene copolymers may also be used; these styrene copolymers advantageously have at least 50% by weight, preferably at least 80% by weight, of styrene incorporated in the form of polymerized units. Suitable comonomers are, for example, α-methylstyrene, styrenes halogenated on the nucleus, acrylonitrile, esters of acrylic or methacrylic acid with alcohols having 1 to 8 carbon atoms, N-vinylcarbazole, maleic acid (anhydride), (meth)acrylamides and/or vinyl acetate.

The polystyrene and/or styrene copolymer may advantageously comprise a small amount of a chain-branching agent incorporated in the form of polymerized units, i.e. a compound having more than one double bond, preferably two double bonds, such as divinylbenzene, butadiene and/or butanediol diacrylate. The branching agent is used in general in amounts of from 0.005 to 0.05 mol %, based on styrene.

Styrene (co)polymers having molecular weights and molecular weight distributions as described in EP-B 106 129 and in DE-A 39 21 148 are advantageously used. Styrene (co)polymers having a molecular weight in the range from 190 000 to 400 000 g/mol are preferably used.

It is also possible to use mixtures of different styrene (co) polymers.

Preferably used styrene polymers are glass-clear polystyrene (GPPS), impact-resistant polystyrene (HIPS), anionically polymerized polystyrene or impact-resistant polystyrene (A-IPS), styrene-α-methylstyrene copolymers, acrylonitrile-butadiene-styrene polymers (ABS), styrene-acrylonitrile (SAN), acrylonitrile-styrene-acrylate (ASA), methacrylate-butadiene-styrene (MBS), methyl methacrylate-acrylonitrile-butadiene-styrene (MABS) polymers or mixtures thereof or with polyphenylene ether (PPE).

Styropor®, Neopor® and/or Peripor® from BASF Aktiengesellschaft are particularly preferably used as polystyrene.

Already prefoamed polystyrene and/or styrene copolymers are advantageously used.

In general, the prefoamed polystyrene can be prepared by all processes known to the person skilled in the art (for example DE 845 264). For the preparation of prefoamed polystyrene and/or prefoamed styrene copolymers, the expandable styrene polymers are expanded in a known manner by heating to temperatures above their softening point, for example with hot air or preferably steam.

The prefoamed polystyrene or prefoamed styrene copolymer advantageously has a bulk density of from 10 to 100 kg/m$^3$, preferably from 15 to 80 kg/m$^3$, particularly preferably from 20 to 70 kg/m$^3$, in particular from 30 to 60 kg/m$^3$.

The prefoamed polystyrene or prefoamed styrene copolymer is advantageously used in the form of spheres or beads having an average diameter of, advantageously, from 0.25 to 10 mm, preferably from 0.5 to 5 mm, in particular from 0.75 to 3 mm.

The prefoamed polystyrene or prefoamed styrene copolymer spheres advantageously have a small surface area per unit volume, for example in the form of a spherical or elliptical particle.

The prefoamed polystyrene or prefoamed styrene copolymer spheres advantageously have closed cells. The proportion of open cells according to DIN-ISO 4590 is as a rule less than 30%.

Shaped articles comprising foamed styrene polymer or styrene copolymer can serve as starting material for foamed polystyrene or foamed styrene copolymer. Such shaped articles can be comminuted by the customary comminution methods to the degree of the individual styrene polymer or styrene copolymer particles, preferably in spherical form. A suitable and preferred comminution method is milling.

Shaped articles comprising foamed styrene polymer or styrene copolymer serve, for example, as packaging material or insulating material.

Shaped articles comprising foam styrene polymer or styrene copolymer which are intended for disposal can serve as starting material for foamed polystyrene or foamed styrene copolymer, for example styrene polymer or styrene copolymer packaging material waste or styrene polymer or styrene copolymer insulating material waste.

Particularly preferably the polystyrene or styrene copolymer or the prefoamed polystyrene or prefoamed styrene copolymer has an antistatic coating.

The substances customary and commonly used in industry may be used as an antistatic agent. Examples are N,N-bis(2-hydroxyethyl)-C$_{12}$-C$_{18}$-alkylamines, fatty acid diethanolamides, choline ester chlorides of fatty acids, C$_{12}$-C$_{20}$-alkanesulfonates and ammonium salts.

Suitable ammonium salts comprise from 1 to 3 organic radicals containing hydroxyl groups on the nitrogen, in addition to alkyl groups.

Suitable quaternary ammonium salts are, for example, those which comprise from 1 to 3, preferably 2, identical or different alkyl radicals having 1 to 12, preferably 1 to 10 carbon atoms and from 1 to 3, preferably 2, identical or different hydroxyalkyl or hydroxyalkylpolyoxyalkylene radicals bonded to the nitrogen cation, with any desired anion, such as chloride, bromide, acetate, methyl sulfate or p-toluenesulfonate.

The hydroxyalkyl and hydroxyalkylpolyoxyalkylene radicals are those which form by oxyalkylation of a nitrogen-bonded hydrogen atom and are derived from 1 to 10 oxyalkylene radicals, in particular oxyethylene and oxypropylene radicals.

A particularly preferably used antistatic agent is a quaternary ammonium salt or an alkali metal salt, in particular sodium salt, of a C$_{12}$-C$_{20}$-alkanesulfonate, e.g. emulsifier K30 from Bayer A G, or mixtures thereof. The antistatic agent can be added as a rule both as pure substance and in the form of an aqueous solution.

The antistatic agent can be added during the process for the preparation of polystyrene or styrene copolymer analogously to the customary additives or can be applied as a coating after the production of the polystyrene particles.

The antistatic agent is advantageously used in an amount of from 0.05 to 6% by weight, preferably from 0.1 to 4% by weight, based on the polystyrene or styrene copolymer.

Even after the pressing to give the light wood-base material, preferably multilayer wood-base material, the filler particles B) are advantageously present in a stage in which their original shape is still recognizable. If appropriate, melting of the filler particles which are present on the surface of the light wood-containing material or preferably of the multilayer wood-base material can occur.

The total amount of the filler B), based on the light wood-containing material, is in the range from 1 to 15% by weight, preferably from 3 to 15% by weight, particularly preferably from 3 to 12% by weight.

The total amount of the filler B) with polystyrene and/or styrene copolymer as the only plastic particle component, based on the light wood-containing material, is in the range from 1 to 15% by weight, preferably from 3 to 15% by weight, particularly preferably from 3 to 12% by weight.

The binder C) comprises, as substantial components, an aminoplast resin and an organic isocyanate having at least two isocyanate groups. In the present applications, the stated absolute and percentage amounts with regard to the component C) are based on these components.

The binder C) comprises as a rule the substances known to the person skilled in the art, generally used for aminoplasts and usually referred to as curing agents, such as ammonium sulfate or ammonium nitrate or inorganic or organic acids, for example sulfuric acid or formic acid, or acid-regenerating substances, such as aluminum chloride, or aluminum sulfate, in each case in the customary, small amounts, for example in the range from 0.1% by weight to 3% by weight, based on the total amount of aminoplast resin in binder C).

Here, aminoplast resin is understood as meaning polycondensates of compounds having at least one carbamido group (the carbamido group is also referred to as carboxamido group) optionally partially substituted by organic radicals and an aldehyde, preferably formaldehyde.

All aminoplast resins known to the person skilled in the art, preferably for the production of wood-base materials, can be used as suitable aminoplast resins. Such resins and their preparation are described, for example, in Ullmanns Enzyklopädie der technischen Chemie, 4$^{th}$ newly revised and extended edition, Verlag Chemie, 1973, pages 403 to 424 "Aminoplaste", and Ullmann's Encyclopedia of Industrial Chemistry, Vol. A2, VCH Verlagsgesellschaft, 1985, pages 115 to 141, "Amino Resins", and in M. Dunky, P. Niemz, Holzwerkstoffe and Leime, Springer 2002, pages 251 to 259 (UF resins) and pages 303 to 313 (MUF and UF with small amount of melamine).

Preferred aminoplast resins are polycondensates of compounds having at least one carbamido group also partly substituted by organic radicals and formaldehyde.

Particularly preferred aminoplast resins are urea-formaldehyde resins (UF resins), melamine-formaldehyde resins (MF resins) or melamine-containing urea-formaldehyde resins (MUF resins).

Very particularly preferred aminoplast resins are urea-formaldehyde resins, for example Kaurit® glue types from BASF Aktiengesellschaft.

Other very preferred aminoplast resins are polycondensates of compounds having at least one amino group also partly substituted by organic radicals and aldehyde, in which the molar ratio of aldehyde to amino group optionally partly substituted by organic radicals is in the range from 0.3 to 1.0, preferably from 0.3 to 0.60, particularly preferably from 0.3 to 0.45, very particularly preferably from 0.30 to 0.40.

Other very preferred aminoplast resins are polycondensates of compounds having at least one amino group —NH$_2$ and formaldehyde, in which the molar ratio of formaldehyde to —NH$_2$ group is in the range from 0.3 to 1.0, preferably from 0.3 to 0.60, particularly preferably from 0.3 to 0.45, very particularly preferably from 0.30 to 0.40.

Other very preferred aminoplast resins are urea-formaldehyde resins (UF resins), melamine-formaldehyde resins (MF resins) or melamine-containing urea-formaldehyde resins (MUF resins), in which the molar ratio of formaldehyde to —NH$_2$ group is in the range from 0.3 to 1.0, preferably from 0.3 to 0.60, particularly preferably from 0.3 to 0.45, very particularly preferably from 0.30 to 0.40.

Other very preferred aminoplast resins are urea-formaldehyde resins (UF resins), in which the molar ratio of formaldehyde to —NH$_2$ group is in the range from 0.3 to 1.0, preferably from 0.3 to 0.60, particularly preferably from 0.3 to 0.45, very particularly preferably from 0.30 to 0.40.

Said aminoplast resins are usually used in liquid form, generally suspended in a liquid suspending medium, preferably in aqueous suspension, but can also be used as a solid.

The solids content of the aminoplast resin suspensions, preferably aqueous suspension, is usually from 25 to 90% by weight, preferably from 50 to 70% by weight.

The solids content of the aminoplast resin in aqueous suspension can be determined according to Günter Zeppenfeld, Dirk Grunwald, Klebstoffe in der Holz- und Möbelindustrie, 2$^{nd}$ edition, DRW-Verlag, page 268. For determining the solids content of aminoplast glues, 1 g of aminoplast glue is accurately weighed into a weighing dish, finely distributed on the bottom and dried for 2 hours at 120° C. in a drying oven. After thermostating at room temperature in a desiccator, the residue is weighed and is calculated as a percentage of the sample weighed.

The aminoplast resins are prepared by known processes (cf. abovementioned Ullmann literature "Aminoplaste" and "Amino Resins" and abovementioned literature Dunky et al.) by reacting the compounds containing carbamido groups, preferably urea and/or melamine, with the aldehydes, preferably formaldehyde, in the desired molar ratios of carbamido group to aldehyde, preferably in water as a solvent.

The establishment of the desired molar ratio of aldehyde, preferably formaldehyde, to amino group optionally partly substituted by organic radicals can also be effected by addition of monomers carrying —NH$_2$ groups to formaldehyde-richer prepared, preferably commercial, aminoplast resins. Monomers carrying NH$_2$ groups are preferably urea and melamine, particularly preferably urea.

The further component of the binder C) is an organic isocyanate having at least two isocyanate groups.

All organic isocyanates known to the person skilled in the art, preferably for the production of wood-base materials or polyurethanes, can be used as suitable organic isocyanates. Such organic isocyanates and their preparation and use are described, for example, in Becker/Braun, Kunststoff Handbuch, 3$^{rd}$ newly revised edition, volume 7 "Polyurethane", Hanser 1993, pages 17 to 21, pages 76 to 88 and pages 665 to 671.

Preferred organic isocyanates are oligomeric isocyanates having 2 to 10, preferably 2 to 8, monomer units and on average at least one isocyanate group per monomer unit.

A particularly preferred organic isocyanate is the oligomeric organic isocyanate PMDI ("polymeric methylenediphenylene diisocyanate") which is obtainable by condensation of formaldehyde with aniline and phosgenation of the isomers and oligomers formed in the condensation (cf. for example Becker/Braun, Kunststoff Handbuch, 3$^{rd}$ newly revised edition, volume 7 "Polyurethane", Hanser 1993, page 18, last paragraph to page 19, second paragraph, and page 76, fifth paragraph).

PMDI products which are very suitable in the context of the present invention are the products of the LUPRANAT® series from BASF Aktiengesellschaft, in particular LUPRANAT® M 20 FB from BASF Aktiengesellschaft.

It is also possible to use mixtures of the organic isocyanates described, the mixing ratio not being critical on the basis of the current state of knowledge.

The total amount of the binder C), based on the light wood-containing material, is in the range from 3 to 50% by weight, preferably from 5 to 15% by weight, particularly preferably from 7 to 10% by weight.

The total amount of the aminoplast resin (always based on the solid), preferably of the urea-formaldehyde resin and/or melamine-urea-formaldehyde resin and/or melamine-formaldehyde resin, particularly preferably urea-formaldehyde resin, in the binder C), based on the light wood-containing material is thereby in the range from 1 to 45% by weight, preferably from 4 to 14% by weight, particularly preferably from 6 to 9% by weight.

The total amount of the organic isocyanate, preferably of the oligomeric isocyanate having 2 to 10, preferably 2 to 8, monomer units and on average at least one isocyanate group per monomer unit, particularly preferably PMDI, in the binder C), based on the light wood-containing material is thereby in the range from 0.1 to 5% by weight, preferably from 0.25 to 3.5% by weight, particularly preferably from 0.5 to 1.5% by weight.

The ratios of the aminoplast resin to the organic isocyanate arise from the above-described ratios of the aminoplast resin binder to light wood-containing material or of the organic isocyanate binder to light wood-base material.

Preferred embodiments of the light wood-containing material comprise from 55 to 92.5% by weight, preferably from 60 to 90% by weight, in particular from 70 to 88% by weight, based on the light wood-containing material, of wood particles, the wood particles having an average density of from 0.4 to 0.85 g/cm$^3$, preferably from 0.4 to 0.75 g/cm$^3$, in particular from 0.4 to 0.6 g/cm$^3$, from 3 to 15% by weight, preferably from 3 to 12% by weight, in particular from 3 to 10% by weight, based on the light wood-containing material, of polystyrene and/or styrene copolymer filler, the filler having a bulk density of from 10 to 100 kg/m$^3$, preferably from 20 to 80 kg/m$^3$, in particular from 30 to 60 kg/m$^3$, and from 3 to 40% by weight, preferably from 5 to 25% by weight, in particular from 5 to 15% by weight, based on the light wood-containing material, of binder, the total amount of the aminoplast resin, preferably of the urea-formaldehyde resin and/or melamine-urea-formaldehyde resin and/or melamine-formaldehyde resin, particularly preferably urea-formaldehyde resin, in the binder C), based on the light wood-containing material being in the range from 1 to 45% by weight, preferably from 4 to 14% by weight, particularly preferably from 6 to 9% by weight, and the total amount of the organic isocyanate, preferably of the oligomeric isocyanate having 2 to 10, preferably 2 to 8, monomer units and on average at least one isocyanate group per monomer unit, particularly preferably PMDI, in binder C), based on the light wood-containing material, being in the range from 0.1 to 5% by weight, preferably from 0.25 to 3.5% by weight, particularly preferably from 0.5 to 1.5% by weight, and the average density of the light wood-containing material being in the range from 200 to 600 kg/m$^3$, preferably in the range from 300 to 575 kg/m$^3$.

If appropriate, further commercially available additives known to the person skilled in the art may be present as component D) in the light wood-containing material according to the invention or the multilayer wood-base material according to the invention, for example water repellents, such as paraffin emulsions, antifungal agents and flameproofing agents.

The present invention further relates to a multilayer wood-base material which comprises at least three wood-base material layers, at least the middle layer(s) comprising a light wood-containing material having an average density in the range from 200 to 600 kg/m$^3$, comprising, based in each case on the light wood-containing material,
A) from 30 to 95% by weight of wood particles;
B) from 1 to 15% by weight of a filler having a bulk density in the range from 10 to 100 kg/m$^3$, selected from the group consisting of foamable plastic particles and already foamed plastic particles;
C) from 3 to 50% by weight of a binder comprising an aminoplast resin and an organic isocyanate having at least two isocyanate groups and, if appropriate,
D) additives.

The average density of the multilayer wood-base material according to the invention, preferably of the three-layer wood-base material according to the invention, is in the range from 300 kg/m$^3$ to 600 kg/m$^3$, preferably in the range from 350 kg/m$^3$ to 600 kg/m$^3$, particularly preferably in the range from 400 kg/m$^3$ to 500 kg/m$^3$.

Preferred parameter ranges and preferred embodiments with regard to the average density of the light wood-containing material with regard to the components A), B), C) and D) and the combination of the features correspond to those described above.

Middle layers in the context of the invention are all layers which are not the outer layers.

The outer layers (usually referred to as "covering layer(s)") preferably have no fillers.

The multilayer wood-base material according to the invention preferably comprises three wood-base material layers, the outer covering layers together accounting for from 1 to 25% of the total thickness of the multilayer wood-base material according to the invention, preferably from 3 to 20%, in particular from 5 to 15%.

The binder used for the outer layers is usually an aminoplast resin, for example urea-formaldehyde resin (UF), melamine-formaldehyde resin (MF), melamine-urea-formaldehyde resin (MUF) or the binder C) according to the invention. Preferably, the binder used for the outer layers is an aminoplast resin, particularly preferably a urea-formaldehyde resin, very particularly preferably an aminoplast resin in which the molar ratio of formaldehyde to —NH$_2$ groups is in the range from 0.3 to 1.0.

The thickness of the multilayer wood-base material according to the invention varies with the application and is as a rule in the range from 0.5 to 100 mm, preferably in the range from 10 to 40 mm, in particular from 15 to 20 mm.

The present invention furthermore relates to a process for the production of multilayer wood-base materials according to the invention as defined above, the components for the individual layers being stacked one on top of the other and pressed at elevated temperature and superatmospheric pressure.

The processes for the production of multilayer wood-base materials are known in principle and are described, for example, in M. Dunky, P. Niemz, Holzwerkstoffe and Leime, Springer 2002, pages 91 to 150.

An example of a process for the production of the multilayer wood-base materials according to the invention is described below.

After chipping of the wood, the particles are dried. If appropriate, coarse and fine fractions are then removed. The remaining particles are sorted by sieving or classification in an airstream. The coarser material is used for the middle layer and the finer material for the covering layers. Middle layer and covering layer particles are coated with glue or mixed and then sprinkled separately from one another in each case with the component B) (only the middle layer(s)), C) (middle layer) and, if appropriate, D) (middle layer and/or covering layers) and with an aminoplast resin (covering layer). First, the covering layer material is sprinkled onto the shaping belt, then the middle layer material—comprising the components B), C) and, if appropriate D)—and finally once again covering layer material. The three-layer particle cake thus produced is precompressed while cold (as a rule at room temperature) and then hot-pressed. The pressing can be effected by all methods known to the person skilled in the art. Usually, the wood particle cake is pressed at a press temperature of from 150° C. to 230° C. to the desired thickness. The duration of pressing is usually from 3 to 15 seconds per mm board thickness. A three-layer particle board is obtained.

Preferred parameter ranges and preferred embodiments with regard to the average density of the light wood-containing material and of the multilayer wood-base material and with regard to the components A), B), C) and, if appropriate, D) and the combination of the features correspond to those described above.

In a further preferred embodiment, the prefoamed or non-prefoamed polystyrene and/or styrene copolymer is provided with an antistatic coating prior to mixing with the binder and/or with the wood particles. Regarding the antistatic agent, the statements made above are applicable.

The present invention furthermore relates to the use of the light wood-containing material according to the invention and of the multilayer wood-base material according to the invention for the production of articles of all kinds, for example furniture, furniture parts or packaging materials and the use of the light wood-containing material according to the invention and of the multilayer wood-base material according to the invention in the construction sector. Examples of articles of all kinds in addition to furniture, furniture parts and packaging materials are wall and ceiling elements, doors and floors.

Examples of furniture or furniture parts are kitchen furniture, cupboards, chairs, tables, worktops, for example for kitchen furniture, and desktops.

Examples of packaging materials are crates and boxes.

Examples for the construction sector are building construction, civil engineering, interior finishing, and tunnel construction, where the wood-containing materials according to the invention or multilayer wood-base materials according to the invention can be used as formwork boards or as supports.

The advantages of the present invention are the low density of the light wood-containing material according to the invention or multilayer wood-base material according to the invention, good mechanical stability being retained. Furthermore, the light wood-containing material according to the invention and the multilayer wood-base material according to the invention can be easily produced; there is no need to convert the existing plants for the production of the multilayer wood-base materials according to the invention.

Surprisingly good are the edging properties of the light wood-containing materials according to the invention or in particular of the multilayer wood-base materials. The edge adheres particularly well and is not uneven or wavy, the narrow surface, in particular of the multilayer wood-base material, does not show through the edge, the edge is stable to pressure and the edging can be effected using customary machines of board production and edging.

Surprisingly, even low-formaldehyde glues, i.e. usually glues having a low molar ratio of formaldehyde to —$NH_2$ groups in the range from 0.3 to 1.0, preferably from 0.3 to 0.6, lead to light wood-containing materials or multilayer wood-base materials, the mechanical properties, for example the transverse tensile strength, of such light wood-containing materials or multilayer wood-base materials being unexpectedly high.

The swelling values of the multilayer wood-base materials according to the invention are advantageously 10% lower, preferably 20% lower, in particular 30% lower, than the swelling values of an analogous board of the same density without filler.

EXAMPLES

Preparation of the Prefoamed Polystyrenes

Neopor® N2200 (Neopor® is a commercial product and brand of BASF Aktiengesellschaft) was treated with steam in a continuous prefoamer. The bulk density of 50 kg/m$^3$ of the small prefoamed polystyrene spheres was established by varying the vapor pressure and the vaporization time. The average particle diameter was from 1.9 to 2.5 mm after the prefoaming.

B) Production of the Multilayer Wood-Base Materials With and Without Fillers Using Formaldehyde-Richer and Formaldehyde-Poorer Urea-Formaldehyde Glues B1) Mixing of the Starting Materials The glues used were Kaurit® glue 335 and Kaurit® glue 347 from BASF Aktiengesellschaft. The molar ratio of formaldehyde to $NH_2$ groups desired for the experiments (F:$NH_2$ below) was established by admixing solid urea. The solids content was adjusted in each case to 67% by weight with water. For more details, also see Tables 1 to 3.

B1.1) For the Covering Layer:

510 g of fine spruce particles (2% residual moisture) were mixed with 82.0 g of a glue liquor comprising 100 parts of UF glue (F:$NH_2$=0.52, solids content 67% by weight), 1.4 parts of a 52% strength by weight ammonium nitrate solution (as curing agent), 3.1 parts of a 60% strength by weight paraffin emulsion and 15 parts of water in a mixer.

B1.2) For the Middle Layer:

5508 g of coarse spruce particles (2% residual moisture) or 4957 g of spruce particles and 540 g of filler or 4315 g of spruce particles and 270 g of filler according to Tables 1 to 3 were mixed in a mixer. Thereafter, 753 g of a glue liquor comprising 100 parts of UF glue (F:$NH_2$ according to Tables 1 to 3; solids content 67% by weight), 5.9 parts of a 52% strength by weight ammonium nitrate solution and 4.0 parts of a 60% strength by weight paraffin emulsion and then, if appropriate, according to Tables 1 to 3, 54.0 g of PMDI (Lupranat® M 20 FB from BASF Aktiengesellschaft) were applied.

B 2) Pressing of the Glue-Coated Particles

The material for the production of a three-layer particle board was sprinkled into a 30×30 cm mold. First the covering layer material, then the middle layer material and finally once again the covering layer material were sprinkled. The total mass was chosen so that, at the end of the pressing process, the desired density was obtained at a theoretical thickness of 16 mm. The mass ratio (weight ratio) of covering layer material to middle layer material to covering layer material was 17:66:17 in all experiments. In all experiments, the mixture described above under B1.1) was used as covering layer material. The middle layer material was produced according to B1.2) and varied according to Tables 1 to 3.

After the sprinkling, precompression was effected at room temperature, i.e. "cold", and pressing was then effected in a hot press (press temperature 210° C., pressing time 210 s). The theoretical thickness of the board was 16 mm in each case.

C) Investigation of the Multilayer Wood-Base Materials

C 1) Density

The density was determined 24 hours after production according to EN 1058.

C 2) Transverse Tensile Strength

The transverse tensile strength is determined according to EN 319.

C 3) Swelling Values and Water Absorption

The swelling values and the water absorption were determined according to DIN EN 317.

C 4) Formaldehyde Emission

The formaldehyde emission was determined according to DIN EN 120 (perforator method)

C 5) Edging Properties

The edge material used was a melamine edge (thickness 0.6 mm). The adhesive used was Unitol 089618 from Wetzel GmbH (EVA hotmelt adhesive).

200 g/m$^2$ of hotmelt adhesive were applied to the narrow surface of the multilayer wood-base material and the edge material was pressed onto the narrow surface immediately thereafter so that 5 cm of edge material projected. After 24 h in a conditioning chamber (20° C./65% relative humidity), tension was applied to the projecting edge material (perpendicularly to the narrow surface) and the quality of the gluing was rated according to a school mark system. 1=very good properties; 6=inadequate properties. The rating included not only the adhesion but also the visual appearance (uniform smooth surface or reproduction of the board material) and the stability to pressure.

The results of the experiments are listed in Tables 1, 2 and 3.

Only the quantity data for the middle layer are stated in the tables. The covering layers are identical in all experiments (see above). The quantity data relate in all cases to the dry substance. In stating the parts by weight, the dry wood or the sum of the dry wood and of the filler is set at 100 parts. In stating the % by weight, the sum of all dry constituents of the middle layer in the finished multilayer wood-base material is equal to 100%.

The measurement of the density, of the strengths, of the swelling values, of the water absorption, of the edging properties and of the perforator value (formaldehyde emission) was effected on the finished three-layer particle board.

The experiments in Table 1, 2 or 3 without addition of Neopor® and PMDI serve for comparison.

TABLE 1

Experiments with UF glue having a molar ratio F:NH$_2$ = 0.52

| Experiment | UF glue (F:NH$_2$ = 0.52) parts by weight | UF glue (F:NH$_2$ = 0.52) % by weight | PMDI parts by weight | PMDI % by weight | Wood parts by weight | Wood % by weight | Neopor parts by weight | Neopor % by weight | Density of material [kg/m$^3$] | Transverse tensile strength [N/mm$^2$] | Water absorption [%] | Swelling value [%] | Perforator value [mg FA/ 100 g] | Edging properties (school mark) |
|---|---|---|---|---|---|---|---|---|---|---|---|---|---|---|
| 1 | 8.5 | 7.8 | — | — | 100 | 92.2 | — | — | 650 | 0.75 | 70 | 23 | 5.0 | 2 |
| 2 | 8.5 | 7.8 | — | — | 100 | 92.2 | — | — | 550 | 0.60 | 89 | 18 | 5.1 | 4 |
| 3 | 8.5 | 7.8 | — | — | 100 | 92.2 | — | — | 510 | 0.54 | 99 | 18 | 5.0 | 6 |
| 4 | 8.5 | 7.8 | 1 | 0.91 | 100 | 91.3 | — | — | 570 | 0.75 | 64 | 15 | 4.8 | 3 |
| 5 | 8.5 | 7.8 | 1 | 0.91 | 100 | 91.3 | — | — | 550 | 0.65 | 71 | 15 | 5.0 | 4 |
| 6 | 8.5 | 7.8 | 1 | 0.91 | 100 | 91.3 | — | — | 490 | 0.51 | 87 | 14 | 5.0 | 6 |
| 7 | 8.5 | 7.8 | — | — | 90 | 83.0 | 10 | 9.2 | 560 | 0.83 | 61 | 14 | 5.1 | 2 |
| 8 | 8.5 | 7.8 | — | — | 90 | 83.0 | 10 | 9.2 | 520 | 0.68 | 77 | 14 | 4.9 | 2 |
| 9 | 8.5 | 7.8 | — | — | 90 | 83.0 | 10 | 9.2 | 480 | 0.55 | 92 | 13 | 4.8 | 3 |
| 10 | 8.5 | 7.8 | 1 | 0.91 | 90 | 92.2 | 10 | 9.2 | 560 | 1.00 | 54 | 12 | 5.0 | 1 |
| 11 | 8.5 | 7.8 | 1 | 0.91 | 90 | 92.2 | 10 | 9.2 | 520 | 0.79 | 63 | 12 | 5.1 | 2 |
| 12 | 8.5 | 7.8 | 1 | 0.91 | 90 | 92.2 | 10 | 9.2 | 470 | 0.63 | 72 | 12 | 4.8 | 2 |
| 13 | 8.5 | 7.8 | 1 | 0.91 | 95 | 86.8 | 5 | 4.6 | 570 | 0.93 | 55 | 14 | 5.1 | 2 |
| 14 | 8.5 | 7.8 | 1 | 0.91 | 95 | 86.8 | 5 | 4.6 | 510 | 0.73 | 64 | 13 | 5.0 | 2 |
| 15 | 8.5 | 7.8 | 1 | 0.91 | 95 | 86.8 | 5 | 4.6 | 470 | 0.63 | 76 | 12 | 5.1 | 3 |

TABLE 2

Experiments with UF glue having a molar ratio F:NH$_2$ = 0.44

| Experiment | UF glue (F:NH$_2$ = 0.44) parts by weight | UF glue (F:NH$_2$ = 0.44) % by weight | PMDI parts by weight | PMDI % by weight | Wood parts by weight | Wood % by weight | Neopor parts by weight | Neopor % by weight | Density of material [kg/m$^3$] | Transverse tensile strength [N/mm$^2$] | Water absorption [%] | Swelling value [%] | Perforator value [mg FA/ 100 g] | Edging properties (school mark) |
|---|---|---|---|---|---|---|---|---|---|---|---|---|---|---|
| 16 | 8.5 | 7.8 | — | — | 100 | 92.2 | — | — | 650 | 0.57 | 95 | 33 | 2.3 | 2 |
| 17 | 8.5 | 7.8 | — | — | 100 | 92.2 | — | — | 560 | 0.41 | 104 | 26 | 2.4 | 3 |
| 18 | 8.5 | 7.8 | — | — | 100 | 92.2 | — | — | 510 | 0.33 | 104 | 23 | 2.4 | 6 |
| 19 | 8.5 | 7.8 | 1 | 0.91 | 100 | 91.3 | — | — | 550 | 0.58 | 71 | 19 | 2.5 | 3 |
| 20 | 8.5 | 7.8 | 1 | 0.91 | 100 | 91.3 | — | — | 500 | 0.47 | 85 | 18 | 2.3 | 5 |
| 21 | 8.5 | 7.8 | 1 | 0.91 | 100 | 91.3 | — | — | 470 | 0.38 | 91 | 15 | 2.3 | 6 |
| 22 | 8.5 | 7.8 | — | — | 90 | 83.0 | 10 | 9.2 | 550 | 0.44 | 98 | 24 | 2.3 | 2 |
| 23 | 8.5 | 7.8 | — | — | 90 | 83.0 | 10 | 9.2 | 520 | 0.39 | 99 | 20 | 2.4 | 3 |
| 24 | 8.5 | 7.8 | — | — | 90 | 83.0 | 10 | 9.2 | 470 | 0.30 | 112 | 18 | 2.4 | 3 |
| 25 | 8.5 | 7.8 | 1 | 0.91 | 90 | 92.2 | 10 | 9.2 | 550 | 0.79 | 58 | 16 | 2.3 | 1 |
| 26 | 8.5 | 7.8 | 1 | 0.91 | 90 | 92.2 | 10 | 9.2 | 500 | 0.65 | 69 | 15 | 2.5 | 2 |
| 27 | 8.5 | 7.8 | 1 | 0.91 | 90 | 92.2 | 10 | 9.2 | 460 | 0.52 | 83 | 15 | 2.5 | 2 |
| 28 | 8.5 | 7.8 | 1 | 0.91 | 95 | 86.8 | 5 | 4.6 | 570 | 0.74 | 58 | 14 | 2.4 | 1 |
| 29 | 8.5 | 7.8 | 1 | 0.91 | 95 | 86.8 | 5 | 4.6 | 510 | 0.61 | 70 | 13 | 2.4 | 2 |
| 30 | 8.5 | 7.8 | 1 | 0.91 | 95 | 86.8 | 5 | 4.6 | 470 | 0.48 | 85 | 12 | 2.4 | 3 |

TABLE 3

Experiments with UF glue having a molar ratio F:NH$_2$ = 0.38

| Experiment | UF glue (F:NH$_2$ = 0.38) parts by weight | UF glue (F:NH$_2$ = 0.38) % by weight | PMDI parts by weight | PMDI % by weight | Wood parts by weight | Wood % by weight | Neopor parts by weight | Neopor % by weight | Density of material [kg/m$^3$] | Transverse tensile strength [N/mm$^2$] | Water absorption [%] | Swelling value [%] | Perforator value [mg FA/ 100 g] | Edging properties (school mark) |
|---|---|---|---|---|---|---|---|---|---|---|---|---|---|---|
| 31 | 8.5 | 7.8 | — | — | 100 | 92.2 | — | — | 640 | 0.50 | 113 | 40 | 1.2 | 2 |
| 32 | 8.5 | 7.8 | — | — | 100 | 92.2 | — | — | 560 | 0.36 | 121 | 34 | 1.2 | 4 |
| 33 | 8.5 | 7.8 | — | — | 100 | 92.2 | — | — | 500 | 0.26 | 120 | 31 | 1.3 | 5 |
| 34 | 8.5 | 7.8 | 1 | 0.91 | 100 | 91.3 | — | — | 560 | 0.51 | 93 | 28 | 1.2 | 3 |
| 35 | 8.5 | 7.8 | 1 | 0.91 | 100 | 91.3 | — | — | 510 | 0.41 | 103 | 25 | 1.2 | 4 |
| 36 | 8.5 | 7.8 | 1 | 0.91 | 100 | 91.3 | — | — | 470 | 0.32 | 108 | 21 | 1.3 | 6 |
| 37 | 8.5 | 7.8 | — | — | 90 | 83.0 | 10 | 9.2 | 550 | 0.41 | 112 | 30 | 1.3 | 2 |
| 38 | 8.5 | 7.8 | — | — | 90 | 83.0 | 10 | 9.2 | 500 | 0.36 | 122 | 28 | 1.3 | 3 |
| 39 | 8.5 | 7.8 | — | — | 90 | 83.0 | 10 | 9.2 | 460 | 0.28 | 125 | 25 | 1.2 | 4 |
| 40 | 8.5 | 7.8 | 1 | 0.91 | 90 | 92.2 | 10 | 9.2 | 550 | 0.73 | 81 | 22 | 1.2 | 1 |
| 41 | 8.5 | 7.8 | 1 | 0.91 | 90 | 92.2 | 10 | 9.2 | 510 | 0.63 | 88 | 19 | 1.4 | 1 |
| 42 | 8.5 | 7.8 | 1 | 0.91 | 90 | 92.2 | 10 | 9.2 | 460 | 0.50 | 93 | 18 | 1.2 | 2 |
| 43 | 8.5 | 7.8 | 1 | 0.91 | 95 | 86.8 | 5 | 4.6 | 560 | 0.69 | 76 | 23 | 1.2 | 1 |

TABLE 3-continued

Experiments with UF glue having a molar ratio F:NH₂ = 0.38

| Experiment | UF glue (F:NH$_2$ = 0.38) | UF glue (F:NH$_2$ = 0.38) | PMDI parts by weight | PMDI % by weight | Wood parts by weight | Wood % by weight | Neopor parts by weight | Neopor % by weight | Density of material [kg/m$^3$] | Transverse tensile strength [N/mm$^2$] | Water absorption [%] | Swelling value [%] | Perforator value [mg FA/100 g] | Edging properties (school mark) |
|---|---|---|---|---|---|---|---|---|---|---|---|---|---|---|
| 44 | 8.5 | 7.8 | 1 | 0.91 | 95 | 86.8 | 5 | 4.6 | 510 | 0.59 | 86 | 22 | 1.3 | 2 |
| 45 | 8.5 | 7.8 | 1 | 0.91 | 95 | 86.8 | 5 | 4.6 | 460 | 0.46 | 95 | 20 | 1.3 | 3 |

We claim:

1. A light wood-containing material having an average density in the range from 200 to 600 kg/m³, comprising, based in each case on the wood-containing material:
   A) from 30 to 95% by weight of wood particles;
   B) from 1 to 15% by weight of a filler having a bulk density in the range from 10 to 100 kg/m³, selected from the group consisting of foamable plastic particles and already foamed plastic particles;
   C) from 3 to 50% by weight of a binder comprising an aminoplast resin and an organic isocyanate having at least two isocyanate groups and, optionally,
   D) additives.

2. The light wood-containing material according to claim 1, wherein the component B) is selected from the group consisting of styrene homopolymer, styrene copolymer, C$_2$- to C$_{10}$-olefin homopolymer, copolymers of C$_2$- to C$_{10}$-olefins, PVC (rigid and flexible), polycarbonate, polyisocyanurate, polycarbodiimide, polyacrylimide, polymethacrylimide, polyamide, polyester, polyurethane, aminoplast resin and phenol resin.

3. The light wood-containing material according to claim 1, wherein the component B) is selected from the group consisting of styrene homopolymer and styrene copolymer.

4. The light wood-containing material according to claim 1, wherein the organic isocyanate of component C) being PMDI.

5. The light wood-containing material according to claim 1, wherein the aminoplast resin is selected from the group consisting of urea-formaldehyde resin, melamine-formaldehyde resin and melamine-urea-formaldehyde resin.

6. The light wood-containing material according to claim 1, wherein the molar formaldehyde: —NH$_2$ group ratio being in the range from 0.3 to 1.0.

7. The light wood-containing material according to claim 1, wherein the content of the aminoplast resin in the component C), based on the light wood-containing material, being in the range from 1 to 45% by weight and the total content of the organic isocyanate in the component C), based on the light wood-containing material, being in the range from 0.1 to 5% by weight.

8. A multilayer wood-base material which comprises at least three layers, only the middle layer or at least a part of the middle layer comprising the light wood-containing material according to claim 1.

9. A multilayer wood-base material which comprises at least three layers, only the middle layer or at least a part of the middle layer comprising the light wood-containing material according to claim 1 and the outer covering layers comprising no filler.

10. The multilayer wood-base material according to claim 8, having an average density in the range from 300 kg/m³ to 600 kg/m³.

11. A process for the production of the light wood-containing material as claimed in claim 1, which comprises mixing components A, B, C and optionally D,
   A) from 30 to 95% by weight of wood particles;
   B) from 1 to 15% by weight of a filler having a bulk density in the range from 10 to 100 kg/m³, selected from the group consisting of foamable plastic particles and already foamed plastic particles;
   C) from 3 to 50% by weight of a binder comprising an aminoplast resin and an organic isocyanate having at least two isocyanate groups and,
   D) additives
   and then pressing at elevated temperature and under superatmospheric pressure.

12. A process for the production of the multilayer wood-base material as claimed in claim 8, which comprises stacking the components for the individual layers one on top of the other and pressing at elevated temperature and superatmospheric pressure.

13. A process for the production of articles in the construction sector which comprises utilizing the light wood-containing material as claimed in claim 1.

14. A process for the production of articles in the construction sector which comprises utilizing the multilayer wood-base material as claimed in claim 8.

15. A process for the production of items of furniture and furniture parts, of packaging materials, in housebuilding or in interior finishing which comprises utilizing the light wood-containing material as claimed in claim 1.

16. A process for the production of items of furniture and furniture parts, of packaging materials, in housebuilding or in interior finishing which comprises utilizing the multilayer wood-base material as claimed in claim 8.

17. A process for the production of the multilayer wood-base materials of claim 8 having a density in the range from 200 to 600 kg/m³—which comprises utilizing a binder comprising an aminoplast resin and an organic isocyanate having at least two isocyanate groups, the molar formaldehyde: —NH$_2$ group ratio being in the range from 0.3 to 1.0.

18. A process for the production of light wood-containing materials or light multilayer wood-base materials as defined in claim 1 which comprises utilizing a binder comprising an aminoplast resin and an organic isocyanate having at least two isocyanate groups, the molar formaldehyde: —NH$_2$ group ratio being in the range from 0.3 to 1.0.

* * * * *